Jan. 23, 1962
C. A. PARKER
3,018,039
CODE READ-IN TRANSLATOR FOR CONTROLLING
LISTER-CALCULATING MACHINES
Filed June 25, 1956
8 Sheets-Sheet 1

FIG. 1

INVENTOR.
CHARLES A. PARKER
BY
AGENT

Jan. 23, 1962    C. A. PARKER    3,018,039
CODE READ-IN TRANSLATOR FOR CONTROLLING
LISTER-CALCULATING MACHINES Filed June 25, 1956           8 Sheets-Sheet 2

*INVENTOR.*
CHARLES A. PARKER

BY *Elmer W. Edwards*

AGENT

INVENTOR.
CHARLES A. PARKER

BY
AGENT

Jan. 23, 1962   C. A. PARKER   3,018,039
CODE READ-IN TRANSLATOR FOR CONTROLLING
LISTER-CALCULATING MACHINES
Filed June 25, 1956   8 Sheets-Sheet 6

*INVENTOR.*
CHARLES A. PARKER
BY
AGENT

Jan. 23, 1962

C. A. PARKER

3,018,039

CODE READ-IN TRANSLATOR FOR CONTROLLING
LISTER-CALCULATING MACHINES

Filed June 25, 1956

INVENTOR.
CHARLES A. PARKER

BY

AGENT

Jan. 23, 1962 C. A. PARKER 3,018,039
CODE READ-IN TRANSLATOR FOR CONTROLLING
LISTER-CALCULATING MACHINES
Filed June 25, 1956 8 Sheets-Sheet 8

*INVENTOR.*
CHARLES A. PARKER

BY

AGENT

United States Patent Office 3,018,039
Patented Jan. 23, 1962

3,018,039
CODE READ-IN TRANSLATOR FOR CONTROLLING LISTER-CALCULATING MACHINES
Charles A. Parker, East Orange, N.J., assignor to Monroe Calculating Machine Company, Orange, N.J., a corporation of Delaware
Filed June 25, 1956, Ser. No. 593,508
20 Claims. (Cl. 235—60)

This invention relates to lister-calculating machines and more particularly to improved read-in translator devices for controlling therein the registration and printing of digit values which represent data sensed from a record media such, for example, as are obtained from coded perforations effected within the well-known perforated tape or punched record cards.

In the known art to which the invention pertains it is common practice to provide settable digit value stop members adjacent the differential value positions of each of the usual denominational order actuator means for the register/printing devices and to selectively effect an adjustment of said stop members to an active position adapted for controlling digit value displacement of the actuators. Heretofore, however, such adjustment of the stop members has been effected through the use of interponent means which are first caused to be displaced into cooperative relation with the corresponding stop members and which thereafter are operated by suitable power devices for selectively adjusting the related value stops to their active position.

The present invention contemplates improved compact translator devices which are adapted for sequentially receiving coded data, as sensed from a perforated tape, punched card, or the like, and to translate such data selectively into a mechanical movement which is adapted for setting selectively stop elements controlling an operation of the register/printing devices of a lister-calculator whereby the data received in accordance with said coded read-in are caused to be registered and printed as digit values in a known system of notation during a machine cycle of operation thereof following a sequential read-in operation of the translator devices.

Another object of the present invention is the provision of improved read-in translator devices adapted for translating coded data into a mechanical selection and adjustment of control stops which are adapted for determining related digit value operations of the actuator devices in a lister-calculator and which will effect such selection and adjustment of the control stops in a direct manner without recourse to interponent devices.

As a further object the invention includes the provision of magazine means each supporting denominational order groups of said control stops and wherein said magazines are each adapted for independent adjustment to displace the related order stops to an active condition relative to the translator devices. A still further object includes means wherein subsequent operation of the translator devices will thereafter effect a selective adjustment of said stops to their active digit value control condition relative to said actuators in a direct manner, thereby providing a more simple and effective control device through the elimination of the usual interponent devices.

Another object of the invention is the provision of means which effect said adjustment of the magazines consecutively, wherein the denominational orders of said control stops are rendered effective relative to the translator devices in a consecutive manner so that coded multi-digit data as entered sequentially within the read-in devices are caused to be translated and to effect selective digit value adjustment of the stops in accordance with each denominational order of said multidigit data.

Another advantage obtained from the devices of the present invention permits the use of the lister-calculator machine both independently of or in cooperation with the translator devices without the adjustment of any presetting devices.

With the above and other objects in view the nature of which will appear as the description proceeds, the invention resides in the novel construction, combination and arrangement of parts as hereinafter described with reference to the accompanying drawings and more particularly defined by the appended claims.

In the accompanying drawings.

Referring to the drawings the lister-calculator to which the invention is shown as applied is of a well-known type employing registering and printing devices which are operable under control of reciprocatory actuator devices differentially settable to well-defined positions indicative of a zero and 1 to 9 digit values representative of the decimal system of notation. Such a machine is disclosed in its essential features in U.S. Patent 1,932,013 issued October 24, 1933 to Loring P. Crosman, as modified by the disclosure of Patent 1,946,572 issued February 13, 1934 and Patent 2,298,201 issued October 6, 1942 to the same inventor and to which reference is made for details of structure and operation not herein set forth.

It will be sufficient to say that in the normal operations of said machine amounts set up on the digit keys 215 (FIG. 4) for each denominational order are transferred, upon operation of suitable cyclic operating control keys, to a series of accumulator wheels 473 by means of a series of spring operated differential actuators 610 loosely mounted upon a transverse shaft 608. The forward arm of each differential actuator 610 is provided with segmental rack teeth adapted to mesh with the pinions 472 of the series of accumulator wheels 473. Index bars 615 are pivotally connected with the upper arms of levers 610, these index bars being moved, upon counterclockwise rotation of the levers, into engagement with the stems of selectively depressed keys 215. Type bars 611 are pivotally connected to the rearward arm of levers 610, the type bar being provided with a longitudinally disposed series of type representing the digits 0 and 1 to 9. The digit keys which have been depressed to represent a value are latched by suitable slide means 216 in position with the bottoms of their stems lying in the path of movement of the related stop lugs of the bars 615, allowing such bars to advance a distance proportional to the value of the keys upon operation of the machine. Depression of a digit key will also remove a column latch 214 from the path of movement of its selected stop bar 615 these latches preventing movement of a stop bar and levers 610 in any column in which no key is depressed. Each of the racks 610 are held in their normal clockwise position, against tension of their respective spring 683, by a stud 659 fast in said racks and having engagement with a series of dogs 617 pivotally mounted upon the transverse rod 618 supported within a rocker frame 616 loosely mounted on the shaft 608.

Figure 2:
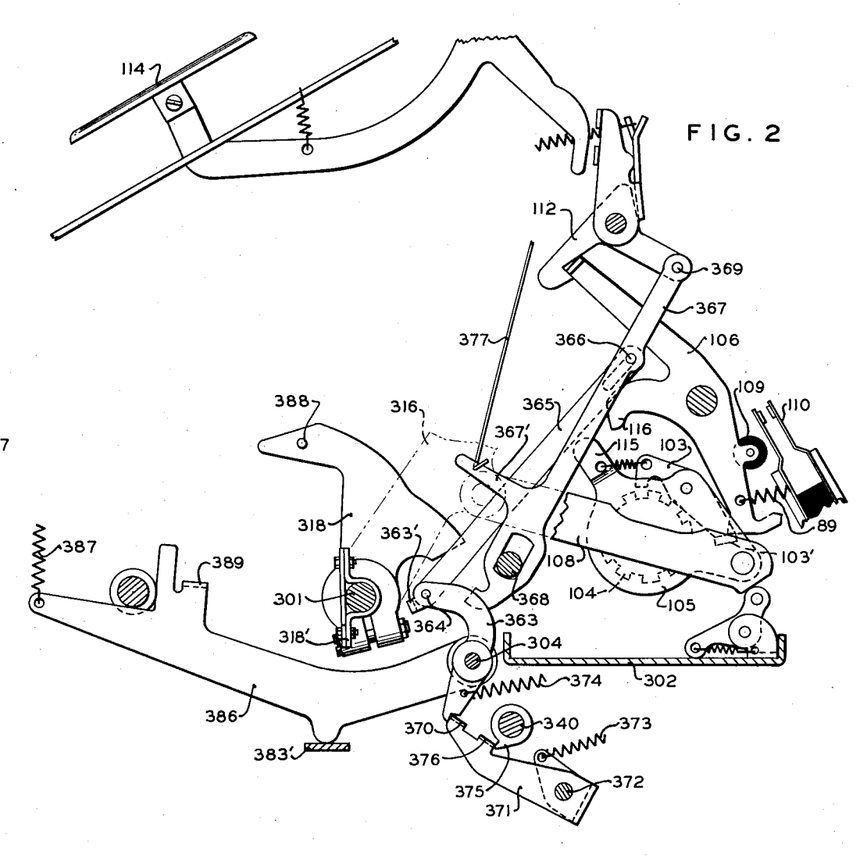
FIG. 2 is a right-side elevation showing the clutch control devices for the lister-calculator.

A rock shaft 301 is oscillated by means of an electric motor 100 connected through suitable gearing and clutch means 103–104 (FIG. 2) with a rock arm 316 fast with shaft 301, by means of a connecting rod 108, so that as a crank arm 105 is rotated by the motor the shaft 301 will be oscillated.

Rock shaft 301 is provided with cam means 318 (FIG. 4) for governing the movement of frame 616. As shaft 301 is rotated forwardly cam 318 will permit frame 616, under influence of spring 616', to be rocked counterclockwise and any of the levers 610 which have been released by the depression of digit keys 215 will be allowed to rotate under influence of their springs 683 until they are stopped by the lugs of bar 615 contacting with the stems of the depressed keys. Upon rearward return movement of shaft 301 cam 318 will restore frame 616 and the dogs 617 will return the operated levers 610 to normal position. This excursion of the levers 610 serves to register amounts set in the keyboard upon one or more accumulators 473 and to set up a similar amount on the printing line of the type bars.

Release of clutch pawl 103 is effected upon depression of an operating key 114 having a rearward arm thereof engageable with the upper arm of a pivot latch 112 to effect release of said latch from a clutch control lever 106, whereupon said lever will be moved counterclockwise by its spring 89, and an insulation roller 109 on said lever will act to close a switch 110 in the circuit of the electric motor. In this movement the lower end of lever 106 will be disengaged from the tail of the spring urged clutch pawl 103, and allow said pawl to fall into engagement with the drive clutch member 104 to effect a machine cycle of operation.

As fully disclosed in reference Patent 1,932,013, during a cycle of operation the wheels of the accumulators 473 are rotated subtractively upon the forward stroke or additively upon the return stroke of the actuators 610, there being an actuator lever 610 and an associated accumulator wheel for each order provided in the machine. Near the end of a forward stroke of the actuators 610 suitable printing hammers 146 are caused to be released to effect a printing in accordance with the displacement of actuators 610 and type bars 611, upon a record sheet inserted around the usual platen 891.

Near the end of the cycle of motor operation an arm 115 of the crank member 105 upon which clutch pawl 103 is mounted will contact a tooth 116 of clutch lever 106 and force said lever back to latching position, breaking the electric circuit and bringing the lower end of lever 106 into the path of movement of a lug 103' of the rotating clutch pawl 103 for effecting a normalizing of said pawl and terminating the operation.

*Code read-in translator*

While the read-in translator devices are shown and described herein in relation to a particular code system which utilizes a read-in combination of significant digit values 8–4–2–1, and which values are translated to corresponding digit values 0 to 9 as expressed in the decimal system of notation it will be obvious to those skilled in the art to which the invention appertains that the devices are subject to modification to receive equally well various other code systems and to effect translations to various other systems of notation.

Various devices which are adapted to the purpose of sensing a coded record effected upon the usual tape means, punched record cards or the like and which may act to generate combinations of coded electrical impulses to selective input circuit leads 300 of the read-in translator devices are well known to those versed in the art and need not therefore be described herein.

Figure 4:
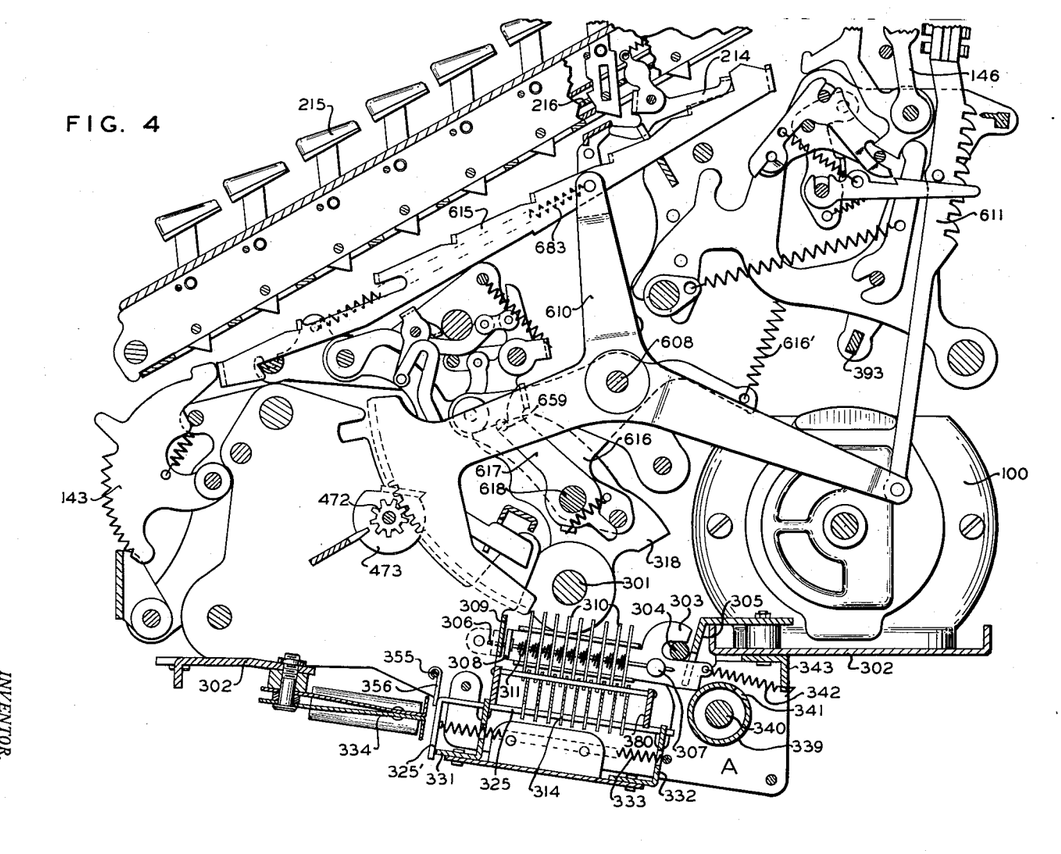
FIG. 4 is a cross-sectional view looking from the right and taken substantially through the middle of the machine.
Figure 5:
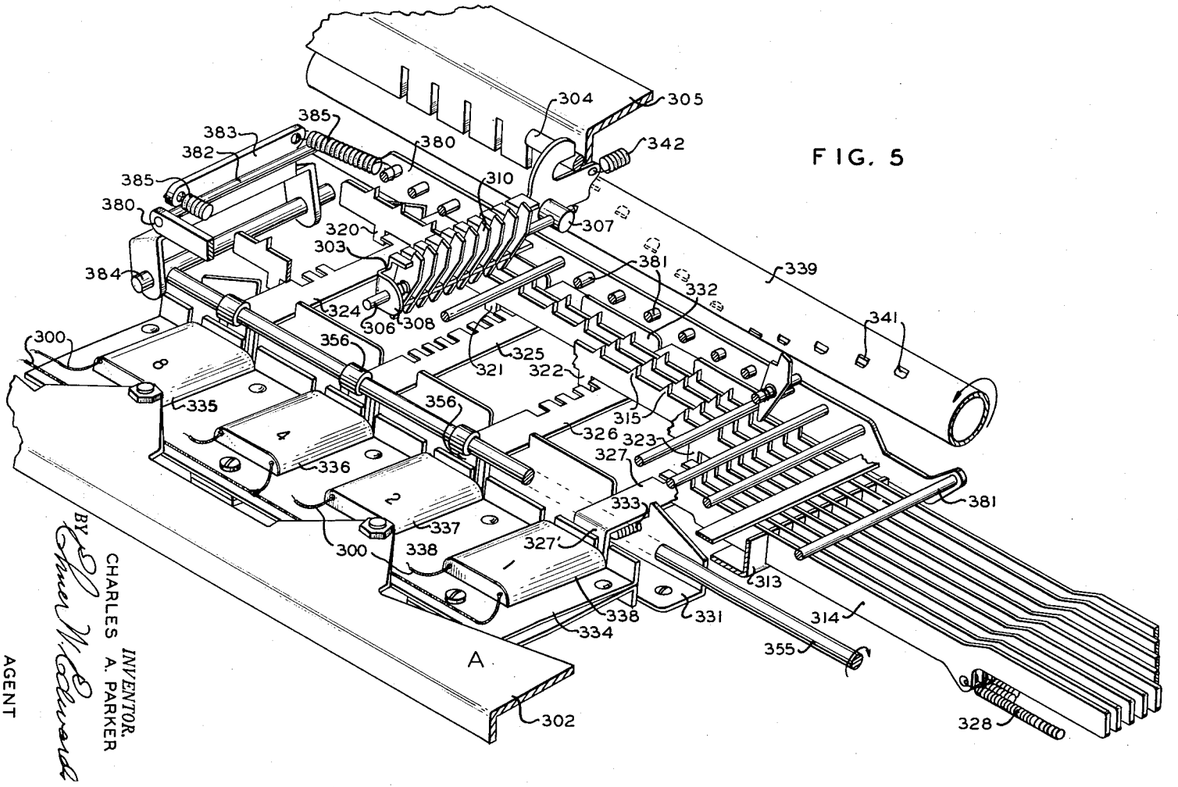
FIG. 5 is a perspective view of the read-in translator devices.
Figure 6:
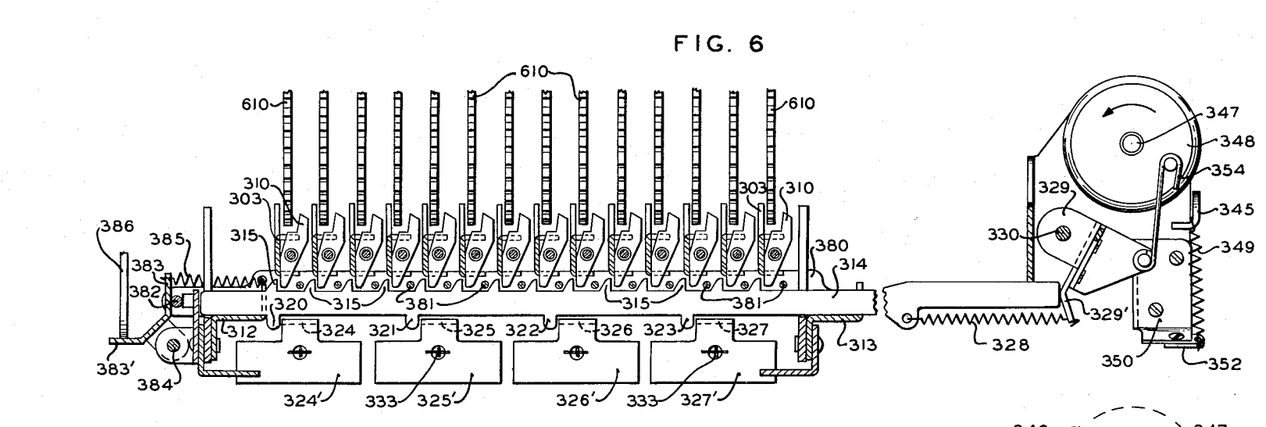
FIG. 6 is a front elevation of the read-in translator devices, the parts being at normal condition of rest.

With reference in particular to FIGS. 4 to 6 of the drawings the read-in translator unit, designated by the letter A, is suspended to the bottom framing 302 of the lister-calculating machine and extends transversely beneath the actuator members 610. For each denominational order of the actuators 610 there is provided in the read-in translator means a slideable magazine member 303, each of which extends longitudinally of the related actuator 610. The rearward end of each of said magazines has support, through means of open end slot therein, upon a transverse rod 304, mounted within the left and right side framing of the translator unit. A suitable notched plate 305 serves to hold the magazines 303 in columnar spaced relation.

Figures 12, 13:
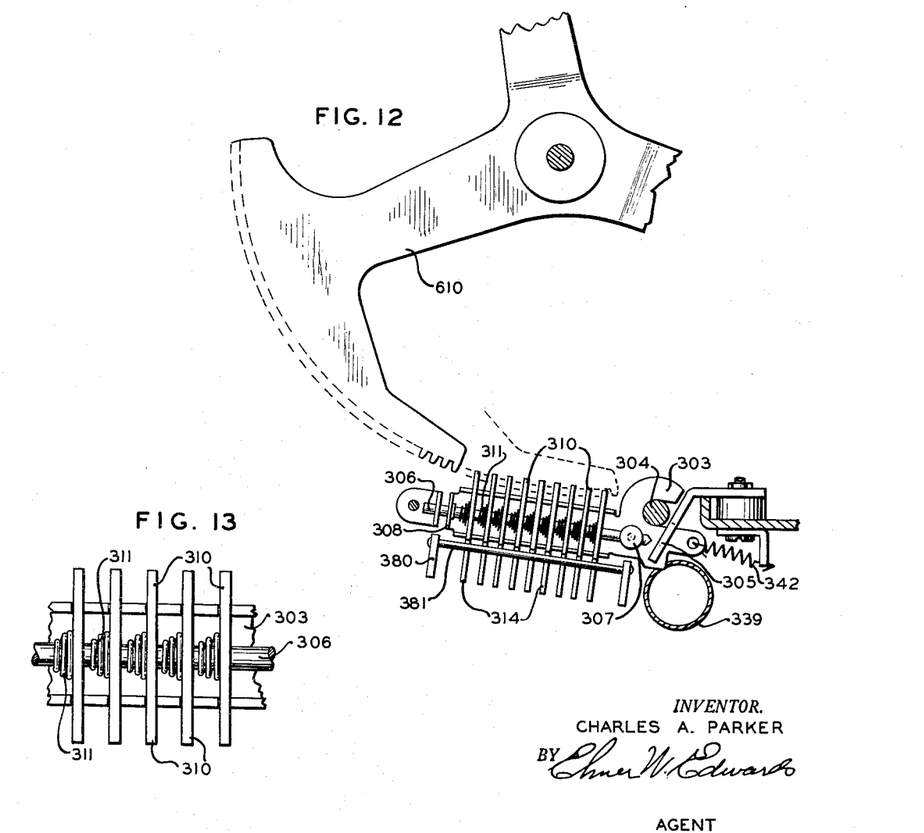
FIG. 12 is a view similar to FIG. 10 and showing a magazine in active position in which the digit value stop pawls are aligned with the permutation slides.
FIG. 13 is an enlarged detail view of spring devices for maintaining the stop pawls in adjusted positions.
Figure 14:
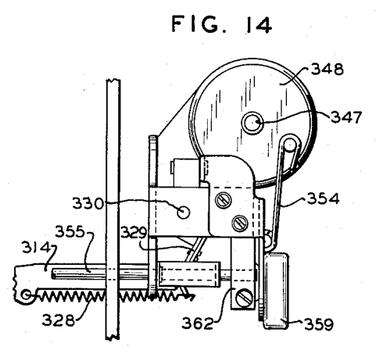
FIGS. 14–16 are detail front views of an electromagnetic device for effecting operations of the permutation slides.
Figure 15:
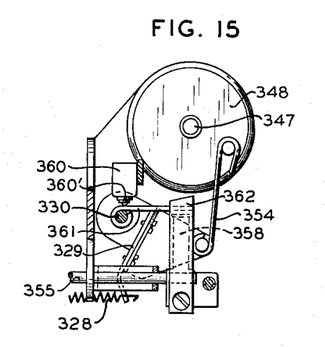

Mounted within each of the magazines 303 is a shaft 306 having the rearward end thereof fast within a stud 307 secured to the related magazine. The forward end of each shaft 306 projects through a lateral lug 308 of the respective magazines and extends also through a forward guide plate 309, to serve as a slideable support for the forward end of said magazines. Each magazine 303 is constructed to form a channel, with the upper and lower portions notched to receive a plurality of settable stop pawls 310 mounted upon the related shaft 306, there being a stop pawl 310 related to each of the digit value positions 0 through 8 of the related actuator racks 610. In the normal position of rest, illustrated in FIG. 6, pawls 310 are each held in clockwise position and out of cooperation with the corresponding racks 610 through means of related friction springs 311 (FIG. 13). Springs 311 being mounted upon support shaft 306 for pawls 310 and formed as a conical helix, with the final turn of said springs having a smaller diameter than that of shaft 306 so as to effect frictional engagement therewith, for the purpose of anchoring one end of said springs.

In assembling the parts within a magazine 303 the shaft 306 is threaded from left to right, as viewed in FIGS. 12–13, to pass successively through a spring 311 and a related pawl 310. Thus springs 311, through frictional engagement of shaft 306 therewith, are caused to be compressed against pawls 310 and said pawls will be held frictionally in engagement with the side wall formed by the notches in the upper and lower members of the magazine channel structure 303.

Supported for slideable movement within suitably notched left and right end support plates 312–313 (FIGS. 5 and 6) is a series of nine permutation slides 314, said slides collectively being indicative of the digit values 0 to 8 inclusive.

Slides 314 are each provided with a plurality of upwardly extending teeth 315, related each to a denominational order of the pawls 310 and being zoned normally out of plane with said pawls. Also slides 314 are provided each with four downwardly extending projections 320–323 which are adapted for selective cooperation with four related decoding slides 324–327, as in the manner hereinafter to be described. To each of the slides 314 there is connected, near the right-hand end thereof, a corresponding spring 328, the opposite ends of which are connected to a rock plate 329. Plate 329 is pivotally mounted upon a support shaft 330 and is provided with an offset portion 329′ engaging the rearward edge of each of the slides 314. Engagement of portion 329′ with slides 314 being intermediate of the pivot shaft 330 of plate 329 and the point of connection of the springs 328 with said plate serves to bias said slides toward the left, as viewed in FIG. 6.

Decoding slides 324–327 are mounted each at their forward and rearward ends thereof within suitable notches formed upon the forward end rearward cross plates 331–332 respectively of the translator unit. Slides 324–327 are each biased toward the rear of the machine by related springs 333, having their forward end connected to the downwardly extending projections 324′–327′ on the forward end of the corresponding slides 324–327 and the rearward end thereof connected to the rear cross plate member 332.

Figure 9:
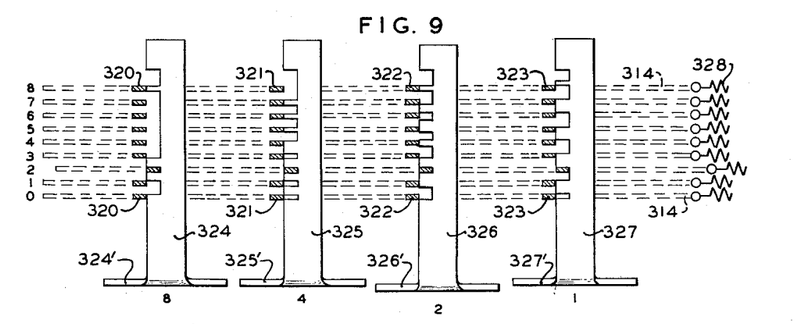
FIG. 9 is a plan view illustrating the decoding and permutation slides as set for a digit value 2 registration control.
Figure 10:
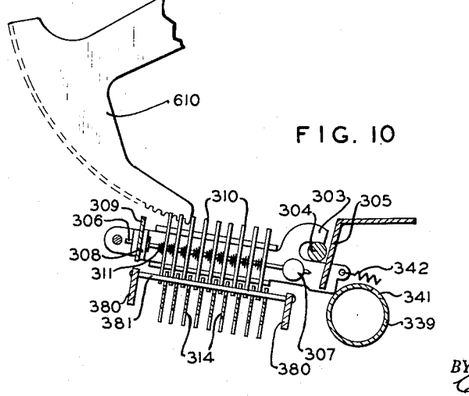
FIG. 10 is a detail view of a denominational order magazine with the digit value stop pawls therein shown held out of cooperation with the permutation slides.

Suitably supported within a subframe 334, fast to the forward framing 302, are four electromagnets 335–338 each of which is in relation to one of the corresponding projections 324′–327′, above-described, so that upon energizing of a magnet the related decoding slide 324–327 will be moved forwardly. The left side edge of each of the decoding slides have been notched to form a pattern of projections which provide a plurality of advanced and a plurality of recessed areas arranged as shown in FIGS. 9 and 11, wherein the projections 320–323 of the slides 314 are adapted of cooperation therewith for selectively controlling a rightward displacement of said slides 314 in accordance with a forward displacement of selective combinations of the decoding slides 324–327, as will be described.

It will be recalled that magnets 335–338 are selectively energized in accordance with an impulse as effected to the input circuit leads 300 by well-known devices adapted to the sensing of data which has been stored in coded form upon the usual perforated tape, punched card or the like. Also that the particular code arrangement embodied herein is adapted to the use of the significant digit combinations 8-4-2-1. Thus in the arrangement embodied herein a selective energizing of magnets 335–338 is adapted to the purpose of effecting a forward displacement to a related combination of decoding slide members 324–327 whereby said decoding slides will act to selectively control a subsequent rightward movement of a related digit value slide 314 as in accordance with the following table.

| Digit Value of Stored Data | Coded Value of Stored Data | Decoding Slides (324–327) | Permutation Slides (314) |
|---|---|---|---|
| 0 | 8+2 | 8+2 | 0 |
| 1 | 1 | 1 | 1 |
| 2 | 2 | 2 | 2 |
| 3 | 2+1 | 2+1 | 3 |
| 4 | 4 | 4 | 4 |
| 5 | 4+1 | 4+1 | 5 |
| 6 | 4+2 | 4+2 | 6 |
| 7 | 4+2+1 | 4+2+1 | 7 |
| 8 | 8 | 8 | 8 |
| 9 | 8+1 | 8+1 | |

Figure 11:
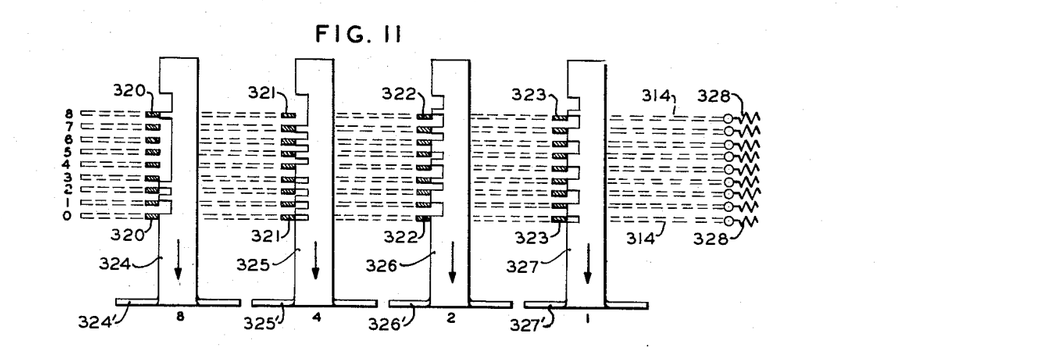
FIG. 11 is a plan view showing the decoding and permutation slides in normal condition of rest.

As shown in FIG. 11, when all of the decoding slides 324–327 are in normal rearward position of rest one or more of the advanced areas on said slides will be positioned opposite the corresponding projections 320–323 of the slides 314, so that, following a release of slides 314 for a rightward displacement, as in the manner to be hereinafter described, all of said slides are normally adapted for engagement with one or more of the projections 320–323 and will thus remain in a leftward position.

It will be recalled that slides 314 are each provided with teeth 315 corresponding to the denominational orders of the stop pawls 310 and which stop pawls are normally zoned out of the path of movement of said slides. In the contemplated mode of operation digit values for multidenominational order amounts are to be received into the translator devices in a sequential manner and thereafter are to be registered and printed in a simultaneous manner. Means are provided therefore whereby each order of the stop pawls 310 are set successively into cooperative relation with the corresponding orders of the actuator racks 610 and thereafter all of the racks 610 automatically released to register and print a complete translated amount in accordance with the selective displacement of the stop pawls 310 by the active slides 314, as will now be described.

Figure 7:
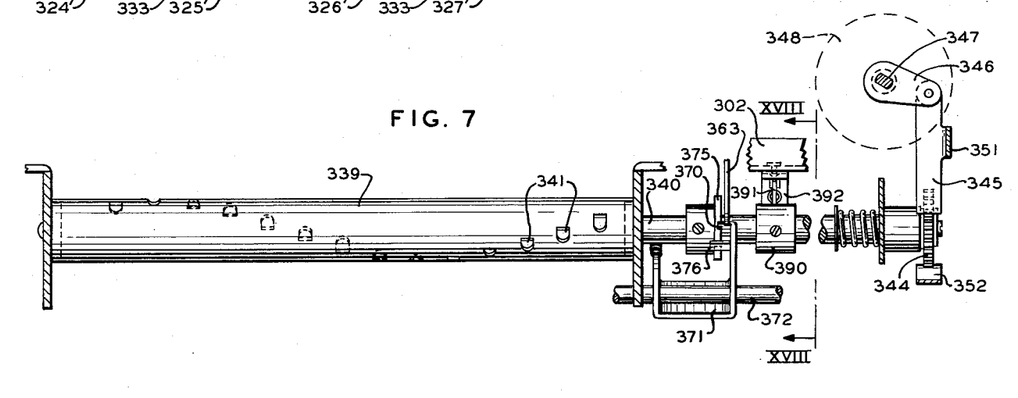
FIG. 7 is a detail front view of cam means for consecutively controlling denominational order operations of the translator devices.
Figure 8:
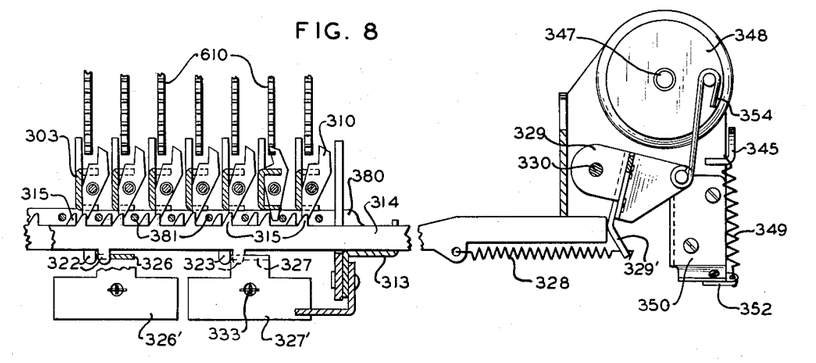
FIG. 8 is a front view similar to FIG. 6 and showing the parts in an operated position.

As shown in FIGS. 5 and 7, extending transversely of the rearward end of the plurality of magazine members 303 is a tubular member 339 secured upon a shaft 340 which extends through said tube and is mounted for rotation within the left and right side framing of the translator unit. Within the peripheral circumference of tube 339 is milled a series of cam slots 341, arranged therein in a helical manner and each adapted for cooperation with a related one of the magazine members 303, as in the manner to be described.

Figure 1:
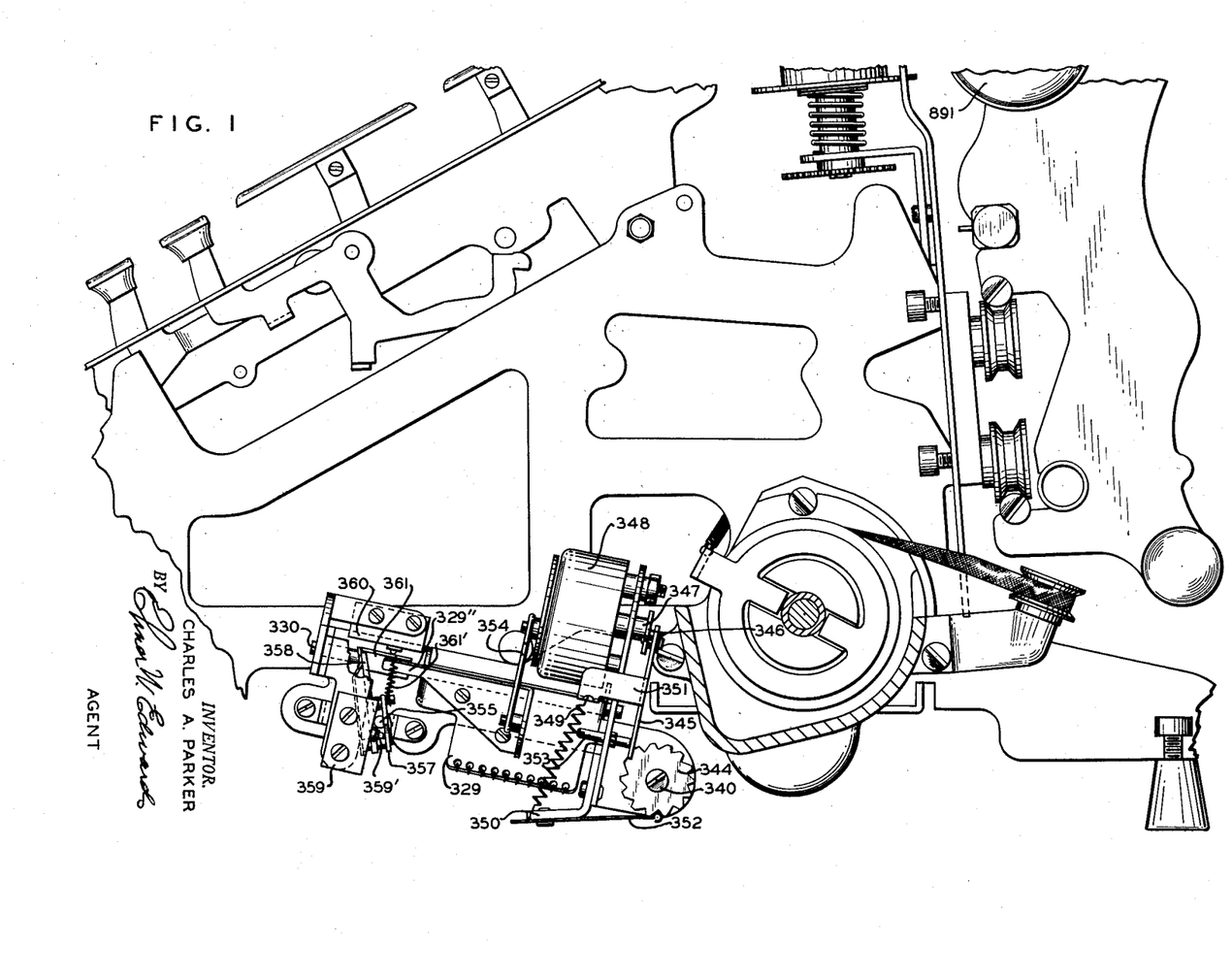
FIG. 1 is a right-side elevation of a lister-calculating machine and showing the code read-in translator devices as associated therewith.
Figure 17:
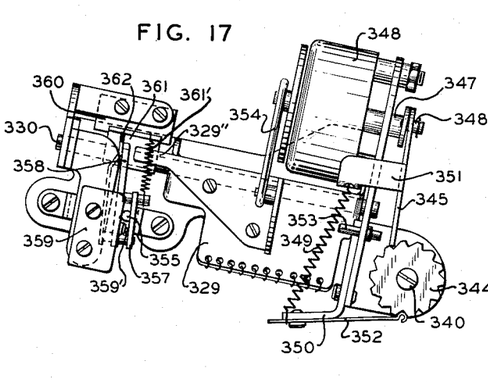
FIG. 17 is a right-side elevation of the electromagnetic device and showing indexing means operable thereby for rotating the cam means shown in FIG. 7.

Cam tube 339 normally holds all of the magazine units 303 in a forward position against the tension of related springs 342, connected each to the rearward end of the related magazines 303 and to a rearward cross plate 343. Upon the right-hand end of the shaft 340 (FIGS. 1 and 7) for cam tube 339 is secured a ratchet wheel 344 having engagement with a pawl 345 pivotally secured to an arm 346 fast to an operating shaft 347 of a rotary solenoid 348, said solenoid being of well-known design. Pawl 345 is biased downwardly and rearwardly into engagement with ratchet wheel 344 by a spring 349, connected at one end thereof with a bracket member 350 and at the opposite end with a forwardly bent lug 351 of ratchet pawl 345. Upon energizing of solenoid 348, in the manner to be described, shaft 347 and arm 346 are caused to be rocked in a counterclockwise direction as viewed in FIG. 7, and pawl 345 will be raised one tooth movement from the position shown in FIG. 1 to the position as illustrated in FIG. 17. A suitable spring click 352 serving at this time to maintain the ratchet wheel 344 and cam tube 339 against rotation. In a subsequent de-energizing of the solenoid 348 spring 349, aided also by the springs 328 (FIG. 6) of slides 314, will act to impart a downward movement to ratchet pawl 345 and thereby index the ratchet wheel 344 and cam tube 339 one step of movement. To prevent an overthrow thereof and to lock said ratchet wheel 344 and cam tube 339 in adjusted position an adjustable stud 353 is mounted within bracket 350 and positioned to buttress the lower forward end of the ratchet pawl 345.

Thus for each operation of the rotary solenoid 348 cam tube 339 will be indexed one step of movement and will cause the cam notches 341 to be brought successively adjacent to their related order magazines 303 from left to right. During a first operation of the tube 339 the left end cam slot 341 is caused to be brought adjacent to the highest order magazine 303 so that said magazine will be moved rearwardly by its spring 342 to a position wherein all the stop pawls 310 thereon are adjacent to the related higher order of teeth 315 on each of the slides 314.

As earlier described, slides 314 are held normally in a leftward position (FIG. 6) by means of springs 328 and the rock plate 329. Rock plate 329 has link connection 354 with the solenoid 348 and during each energizing of said solenoid the plate 329 is caused to be rocked counterclockwise (FIG. 6). In the counterclockwise operation of plate 329 offset portion 329′ thereof is moved away from the slides 314 and the tension exerted by each of said springs 328 to the slides 314 is now reversed so that said slides are adapted to yieldably follow plate 329 for a rightward movement, unless otherwise prevented as in the following manner.

Let it be assumed that a first higher order of the original data is a zero and as such is stored upon the record means in a manner to be subsequently read into the translator devices in the coded form 8+2. Then energizing of the related magnets 335 and 337 for the code value 8+2 (FIG. 5) will cause a forward movement to the corresponding decoding slides 324 and 326. It will be apparent however that in the designed configuration of the control edges for the decoding slides 324–327 illustrated in FIG. 11 that under such a circumstance all of the slides 314 with the exception of the zero slide will have one or more of their projections 320–323 adjacent related advanced portions of the decoding slides 324–327 while each of the projections 320–323 on the zero slide will be opposite a recessed portion of the related decoding slides. Thus upon an operation of plate 329 (FIG. 6) only the zero slide 314 will at this time be permitted to move rightwardly.

As another illustration, let it be supposed that the higher order data includes a significant digit value such, for example, as the digit value 2. Such a value we note by the above table would have been stored upon the record device in the coded value 2. In such a case a read-in from circuit lead 300 (FIG. 5) would act to energize only the magnet 337 for displacing decoding slide 326 to the position as illustrated in FIG. 9. Therefore, in this instance only the slide 314 corresponding to the digit value 2 has all of the projections 320–323 thereof adjacent depressed areas of all the decoding slides 324–327, so that, upon an energizing of solenoid 348 (FIG. 6) for rocking plate 329 said slide only will be permitted a rightward movement. From the above it will be obvious that in like manner any of the slides 314 may be selectively controlled for a rightward movement through means of the forward adjustment of combinations of the decoding slides 324–327 as in accordance with the illustrated table.

For effecting a first operation of the solenoid 348, for the purpose of conditioning the higher order magazine 303 preparatory to a movement of a slide 314, a preliminary code signal, which is stored upon the record means to precede the stored data thereon, is first read into any of the magnets 335–338. During such conditioning operation any movement of slides 314 is immaterial, since all of the magazines 303 are in forward position, with pawls 310 therefore out of cooperation with said slides 314. Solenoid 348 is adapted to be energized under control of any of the read-in magnets 335–338, as follows:

Upon a transverse shaft 355 (FIGS. 4 and 5) pivotally mounted within the right and left side framing of the machine is secured four similar downwardly extending arms 356 each being adapted for engagement by one of the projections 324'–327' of the related decoding slides 324–327. Upon energizing of any of the read-in magnets 335–338 with consequent forward moveent of a slide 324–327 the projections 324'–327' of any active slides 335–338 will engage the related arm 356 and will impart a clockwise movement to the shaft 355. Upon the right-hand end of shaft 355, as viewed from the front of the machine, is a switch control means comprising a pair of plate members 357–358 (FIG. 1) secured together and embracing said shaft for rotation therewith. Associated with plate 357 is a normally open snap switch 359 in the circuit for the solenoid 348. Also in the circuit for solenoid 348 and being in series with snap switch 359 is a normally closed snap-switch 360. Upon a clockwise movement of shaft 355 above-described the plate 357 engages with plunger 359' of snap-switch 359 and will effect a closure of said switch to effect an energizing of the solenoid member 348. Upon a first energizing of solenoid 348 all of the slides 314 move idly of the stop pawls 310 during the first operation of plate 329 by said solenoid. Referring to FIGS. 1 and 14–17, there is mounted fast with plate 329 a forwardly projecting arm 329" which extends beneath a latch member 361, pivotally mounted upon the support shaft 330 for said plate. Latch 361 in its normal condition of rest is in the lowered position shown in FIGS. 1 and 15, wherein said latch is in position of engagement by a spring leaf member 362 fast to the plate 358 of the switch control means above-described. During a clockwise operation of shaft 355 and plate 358 said plate will pass beneath the latch 361, while spring leaf 362 engaging the forward edge of said latch is caused to remain in a counterclockwise position.

Figure 16:
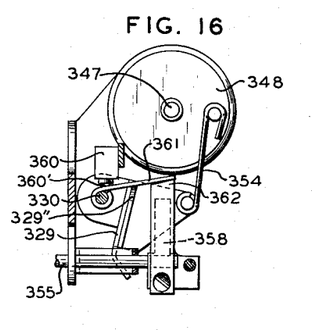

It is recalled that a normally closed switch 360 is in series circuit with the control switch 359 for the solenoid 348. Switch 360 includes an operating plunger 360' which is positioned above the latch member 361, so that, upon a rising of said latch to the position as shown in FIGS. 16–17 the plunger 360' will be operated thereby to open the contacts of switch 360 and thus cause a de-energizing of the solenoid 348. De-energizing of solenoid 348 thereupon permits restoral of plate 329 together with the slides 314 by the springs 328, while at the same time index pawl 345 engaging ratchet wheel 344 will act to index cam tube 339 previously described.

Near the end of a counterclockwise operation of plate 329 by the energized solenoid 348 arm 329" rising upwardly acts to lift latch member 361 and releases the spring leaf member 362, whereupon said spring will snap beneath latch 361. Spring 362 thus acts to maintain said latch in raised position, thereby preventing an immediate re-energizing of the solenoid 348 in the event that a read-in magnet 335–338 has not as yet been released by the record sensing devices. Upon a de-energizing of any active read-in control magnets the shaft 355 with control plates 357, 358 will be restored counterclockwise, under influence of a suitable spring 361'. During such operation plate 357 will immediately reopen switch 359 while plate 358 will act to displace spring leaf 362 from beneath latch member 361 and will reengage the contacts of snap switch member 360 after switch 359 has been reopened. Thus upon a completion of an initial control operation of the translator devices the magazine 303 of the highest order will be in an adjusted position whereby any active slide 314 as subsequently operated in response to a coded read-in signal, in accordance with the above table and in the manner as set forth in connection with the illustrated example relative to the 0 and digit 2 values, will effect the setting of a selective one of the digit value stop pawls 310 mounted within said magazine.

Following a setting of the highest denomination order digit value control pawl 310 cam tube 339 is caused to be indexed as in the manner previously described and during said indexing the extreme left cam notch 341 thereon will act to restore the highest order magazine 303 to the normal forward position out of cooperation with slides 314 and wherein the active set pawl 310 thereon is now in position for controlling a corresponding digit value movement of the related order actuator member 610.

During the restoral of a higher order magazine by the related cam notch 341 the cam notch 341 of the next lower order will act to release its related order magazine 303 for rearward displacement by its spring 342, so that the pawls 310 therein will be moved into position for operation by the slides 314, as in the manner fully described.

It will be apparent from the above description therefore that multiplace coded digit amounts are received into the magnets 324–338 from known sensing devices in sequential denominational order manner and will be translated by decoding slides 324–327 so that the permutation slides 314 will set each order of the digit value pawls 310 in consecutive manner to their active position for controlling the digit value movement of the actuator 610 in the corresponding denominational orders. Following a setting of the lower order pawl 310 in the above sequential operation an automatic operation of the cyclic devices for the actuators 610 to effect a registration and printing of the translated amount is effected as will now be described, with particular reference being made to FIGS. 2 and 7.

Loosely mounted, near the right-hand end, upon shaft 304 is a bell crank lever 363 the upper arm of which has pivotal connection 364 with the lower end of a link 365. The upper end of link 365 has pin and slot connection 366 with a slide 367 guided at the lower end thereof by suitable slot engagement with a fixed stud 368 said slide having pivotal connection 369 with the latch member 112 for the clutch control lever 106 earlier described. The lower end of bell crank lever 363 is provided with a notched end normally in engagement with a lug 370 of a latch 371 fulcrumed upon a transverse rod 372. Latch 371 is biased in a clockwise direction to maintain lug 370 into engagement with bell crank 363 by suitable spring means 373 and such engagement of lug 370 with the notch of bell crank 363 serves to maintain said bell crank in a clockwise direction, against the tension of a spring member 374.

Figure 3:
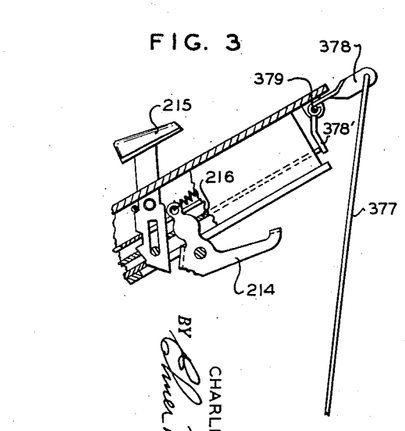
FIG. 3 is a detail view of a control means for releasing the column latches from the actuators.

Secured upon shaft 340 of the cam tube 339 is a cam member 375 which is adapted during an indexing of said shaft, following an operation of the right-hand notch 341 of said tube in setting the lower order of the magazine members 303 earlier described, to effect engagement with a lug 376 of latch 371. Engagement of cam 375 with lug 376 will act to rock latch 371 downwardly releasing the lug 370 from bell crank 363 and permitting counterclockwise operation of said bell crank by its spring 374. Upon said operation link 365 will move slide 367 downwardly and release latch 112 from clutch lever 106 to start a machine cycle of operation. Slide 367 is provided with a forwardly extending arm 367' which has engagement with the lower end of a rod 377 connected at the upper end thereof with an arm 378 fast to a cross shaft 379 (FIG. 3). Fast also upon shaft 379 is a series of arms 378', there being an arm 378 related to each of the keyboard clear slides 216 which act to control the column latch members 214 for the actuators 610, earlier described. Upon downward operation of slide 367 rod 377 rocks arm 378, shaft 379 and arms 378' clockwise, as viewed in FIG. 3, so that arms 378' will move all the slides 216 forwardly and thereby release all the said latches 214 from the stop bars 615 and actuator leavers 610, while also releasing any keys 215 that might have inadvertently been depressed.

During the above machine cycle of operation therefore all of the actuator levers 610 will be permitted to move forwardly until stopped by the active stop pawls 310 relative to each denominational order, whereby a registering and printing operation is effected in accordance therewith, as in the usual manner. In this connection it will be observed that no stop pawl 310 is provided for the digit value nine, it being the purpose to have a nine value translation from an 8+1 code read-in be adapted to condition the encoding slides 324-327 whereby all of the setting slides are controlled thereby to remain in leftward position, so that, all of the stop pawls 310 will remain out of cooperation with their related actuators 610. Under such a condition the actuators 610 would then be permitted to move a full extent of their movement until stopped by engagement thereof with a fixed stop member 393 (FIG. 4) corresponding to a nine step of movement of the actuators. Following a registering printing operation, near the end of the forward stroke of the cyclic devices, all of the stop pawls 310 are caused to be restored simultaneously, in the following manner.

Slideably mounted for forward and rearward movement within the front and rear support frame 312-313 (FIGS. 5 and 6) for the slides 314 is a pair of slideable members 380 which form the side frames of a ladder structure embodying a series of cross rungs 381, extending each transversely of the lower rightward edge of the related order of stop pawls 310. Secured within the frame members 380, at the leftward end thereof, is a tie rod 382 having engagement with the upper rightward face of a bail 383 pivotally mounted upon a shaft 384, mounted within suitable brackets secured to the front support frame 312. A pair of springs 385 are connected each at its leftward end to the upper edge of the bail 383 and at their opposite end to the forward rung 381 of the ladder means 380. Springs 385 serve to hold bail 383 in a yieldable engagement with tie rod 382 and it will be observed that said rod is spaced intermediate of the fulcrum 384 and said spring connections, so that, both the bail 383 and the ladder means 380 are held by said springs in a rightward position, as viewed in FIG. 6. Bail 383 is provided with a forward projection 383' underlying a lever 386 (FIG. 2) pivotally mounted upon the shaft 304 and being held normally in a raised position by suitable spring means 387. Mounted upon the rock arm 318 adapted for operation by the cyclic devices of the lister calculator is a stud 388 adapted near the end of a forward stroke of the machine cycle to engage a lug 389 of lever 386 and rock said lever downwardly. Downward movement of lever 386 will act to impart a counterclockwise (FIG. 6) operation to bail 383, rocking said bail forwardly of tie rod 382 and causing springs 385 to exert a leftward movement to the ladder means 380. Upon said movement of the ladder the rungs 381 thereof will engage any of the stop pawls 310 that have been set to active position and will act to restore said pawls to their normal positions, out of cooperation with the actuator racks 610. At the start of a return stroke of arm 318 (FIG. 2) pin 388 moves away from lug 389 so that spring 387 restores lever 386 thereby releasing bail 383 for clockwise movement by the springs 385 and said bail engaging tie rod 382 will restore the ladder means 380 above-described to its normal rightward position.

As is usual in machines of the character described herein, additive operations are effected in a return stroke of the actuators. Therefore, unless suitable means are otherwise provided the above-described removal of stop pawls 310 would release the actuators 610 to a further forward movement and thus destroy their setting. Well known locking segments 143 (FIG. 4) related to each of the actuators 610 and including means controlled by the cyclic devices for locking said segments until after a return stroke of the actuators are provided, however, such as that disclosed in the reference Patent 2,298,201.

It will be recalled that in a final indexing operation of shaft 340 (FIG. 2) the cam means 375 moving past lug 376 has tripped latch 371 from the lever 363. During the above-described forward movement of arm 318 a clamp 318' on shaft 301 will act to engage with a lug 363' of the operated lever 363, restoring said lever clockwise into reengagement with the lug 370 of said latch 371. In said restoration of lever 363 the link 365 in moving upwardly along slotted connection 366 will free slide 367 for upward movement to permit a reengagement of latch pawl 112 with the clutch lever 106, upon restoral of said lever at the end of the machine cycle of operation as earlier described. Also, upward movement of slide 367, acting to release rod 377 and bell crank 378 (FIG. 3) will free the column latches 214 for restoration by their respective springs.

To prevent an operation of the lister-calculator while a sequential read-in/translating operation is in progress the following means are provided.

Figure 18:
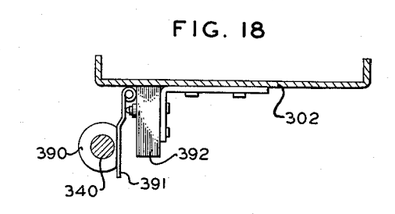
FIG. 18 is a detail view showing cam means and a switch operable thereby to disable the motor circuit for the lister-calculator during operations of the read-in translator devices.

Secured to the shaft 340 (FIG. 18) of cam tube 339 is a collar 390 having a flattened portion thereof forming cam means adapted in the initial movement of the shaft 340 to rock a pivoted arm 391 and release thereby a normally closed snap switch 392 in series circuit with the motor switch 109. Collar 390 thereafter serves to hold switch 392 in open circuit condition whereby circuit to motor 100 will remain broken even though switch 109 should be caused to be operated through the depression of a motor bar, in the manner earlier set forth. Upon a final indexing operation of shaft 340 said cam portion of collar 390, having completed a full rotation, again permits reclosing of switch 392 so that upon a tripping of the cyclic clutch devices by the cam 375 (FIG. 2), earlier described, circuit will be completed to start the motor.

The above means as described and shown in the drawings provide simplified and improved code read-in translator devices adapted to the purpose of controlling digit value entries within the registering/printing devices of a lister-calculator or the like as taken from a coded record media, and which devices accomplish such purpose without employing the use of the usual interponent devices of the known prior art means.

While there has been shown and described a preferred embodiment of the present invention it will be obvious that changes in form and details of the device may be made by those skilled in the art, and it is, therefore, contemplated to cover by the appended claims any such modifications as fall within the true spirit and scope of the invention.

What I claim is:

1. In a computer or the like having registering and printing devices and actuator means therefor adapted for movement to and from differentially predetermined positions; the combination therewith of coded read-in translator devices including decoding means displaceable in selective combinations in accordance with coded read-in signals, a plurality of settable stop members for controlling an extent of movement of said actuator means corresponding to a related of said predetermined positions, a shiftable support means for said plurality of stop members, setting means for each of said stop members and moveable normally ineffective thereof, means for effecting a displacement of said shiftable support means to bring said stop members into active position for adjustment by the said setting means, and wherein said setting means is adapted for cooperation with said decoding means for adjusting said stop members selectively to an active position for controlling an extent of movement of said actuator.

2. The invention according to claim 1 and wherein the setting means include a plurality of slides related each to a corresponding of said stop members, operating means for effecting a uniform displacement of any of the said slides, a plurality of control plates in common with said setting slides and having arranged thereon combinations of uniformly recessed and uniformly advanced surfaces adapted for controlling displacement of a selective of said setting slides in accordance with the displacement of selective combinations of said control plates, and an electromagnet for each of the control plates, said magnets being adapted for displacing in combination one or more of said control plates in accordance with coded impulse read-in control circuits as effected thereto.

3. The invention according to claim 2 including an operating member having yieldable connection with each of the setting slides and adapted for normally holding said slides in a given position, electromagnetic means for effecting an operation of said member, a normally open circuit switch therefor, and control devices operable in the displacement of any of said control plates to cause a closure of said switch for energizing said electromagnetic means for operating said member and thereby effect operation of any selected of said setting slides.

4. The invention according to claim 3 and including a normally closed switch in series circuit with said normally open switch, a control member operable in said operation of said operating member to open the said normally closed switch and de-energize the said electromagnetic means to thereby restore said setting slides, latching means for said control member adapted to maintain the related switch in said open circuit condition, and wherein a de-energizing of the active read-in magnets acts to restore the said latching means and return said switch to a closed condition.

5. The invention according to claim 3 and including a normally closed switch in series circuit with said normally open switch, a control member operable in said operation of said operating member to open the said normally closed switch and de-energize the said electromagnetic means to thereby restore said setting slides, latching means for said control member adapted to maintain the related switch in said open circuit condition, and wherein a de-energizing of the said read-in magnets will restore the control plates and the said control devices operated thereby and will thus restore the said first named switch to normal open circuit condition, and wherein the restoring operation of said control devices acts also to restore the said latching means and release the second named switch to normal closed condition subsequent to the said restoral of said first named switch to open condition.

6. In a computer or the like having registering and printing devices, a plurality of denominational order actuator means therefor adapted each for a movement to and from differentially predetermined digit value positions, the combination therewith of a plurality of settable stop pawls for each denominational order of said actuators and corresponding each to a related of said digit value positions thereof, a plurality of setting slides each in common with the corresponding digit value stop pawls of each denominational order, and wherein said setting slides are movable in a path of movement normally out of cooperation of setting said stop pawls, a plurality of magnetically operated decoding plates adapted for operation in accordance with selective input control circuits for determining a movement of a selected one of said setting slides, means operable automatically under control of said decoding plates for repeatedly bringing said setting slides and successive orders of said stop pawls into and out of cooperative relationship, and wherein for each denominational order a movement of a selective of said setting slides will act to set a corresponding digit value stop pawl relative to controlling a movement of the related denominational order actuator.

7. In a computer or the like having registering and printing devices, a plurality of denominational order actuators therefor adapted for movement to and from differentially predetermined digit value positions, the combination therewith of a plurality of shiftable magazines related each to a corresponding order of said actuators, a plurality of stop pawls supported within each of said magazines and selectively settable for controlling corresponding digit value operations of the related order actuators, a plurality of setting slides for said pawls displaceable freely of engagement therewith, magnetic operating means for said setting slides, and wherein said operating means is adapted for displacing and returning successive orders of said magazines into and out of cooperative relation with said slides, read-in devices including a plurality of electromagnets selectively responsive to an input signal and being each adapted for controlling operations of said operating means, and wherein a forward operation of said operating means in response to a first input signal will effect an idle operation of said setting slides relative to said stop pawls, and wherein a subsequent return operation of said operating means effects a displacement of one of said magazines to bring the stop pawls thereon into cooperative relation with the said setting slides.

8. In a computer or the like having registering and printing devices, a plurality of denominational order actuators therefor adapted for movement to and from differentially predetermined digit value positions, the combination therewith of a plurality of shiftable magazines related each to a corresponding order of said actuators, a plurality of stop pawls supported within each of said magazines and selectively settable for controlling corresponding digit value operations of the related order actuators, a plurality of setting slides for said pawls displaceable freely of engagement therewith, operating means for displacing and returning successive orders of said magazines and including a member having a plurality of elements thereon arranged in helical manner, read-in means including a plurality of electromagnets for selectively receiving an input circuit pulse, magnetic means operable under control of each of said electromagnets for rotating said member and effect sequential displacement of said magazines whereby successive orders of said stop pawls are brought into cooperative position for displacement by a selective of said setting slides, cam means on said member for restoring a displaced magazine concurrently with the release of another of said magazines for displacement by said member, and means operable by the last said magnetic means for effecting an automatic operation of the setting slides in an alternate manner with each of said displacement of a magazine.

9. In a computer or the like having registering and printing devices, a plurality of denominational order actuator means therefor adapted each for movement to and from differentially predetermined digit value positions, the combination therewith of a plurality of settable stop members for each denominational order of said actuators and corresponding each to a related of said digit value positions thereof, shiftable magazines for supporting related orders of said stop members, a plurality of setting slides each in common with the corresponding digit value stop members of each denominational order, read-in devices including magnetic control means for selectively determining the operation of any one of said slides as in accordance with an input signal, a plurality of cam means adapted for effecting a displacement of said magazines relative to the said setting slides in a predetermined denominational order manner, a universal member adapted for controlling operation of any selected one of said slides, a unitary magnet operable upon operation of said control means and adapted for effecting alternate operations of said cam means and said universal member in consecutive order.

10. In a computer or the like having registering and printing devices, a plurality of denominational order actuator means therefor adapted each for movement to and from differentially predetermined digit value positions, the combination therewith of a plurality of settable stop members for each denominational order of said actuators and corresponding each to a related of said digit value positions thereof, shiftable magazines upon which related orders of said stop members are pivotally supported, a plurality of setting slides each in common with the corresponding digit value stop members of each denominational order, a plurality of cam means adapted for effecting a sequential displacement of said magazines relative to the said setting slides in a consecutive denominational order manner, read-in devices including magnetic means operable in accordance with selective input circuits for determining an operation of a selected one of said setting slides, magnetic means operable under control of said first named magnetic means and adapted for effecting a displacement of the selected one of said slides, and wherein during said operation the last named magnetic means thereafter acts to effect an operation of the said cam means to adjust an adjacent order of said stop pawls into active relation with the said setting slides.

11. In a computer or the like having registering and printing devices, a plurality of denominational order actuator means therefor adapted each for movement to and from differentially predetermined digit value positions, the combination therewith of a plurality of settable stop members for each denominational order of said actuators and corresponding each to related digit value positions thereof, shiftable magazines for supporting related orders of said stop members, a plurality of setting slides each in common with the corresponding digit value stop members of each denominational order, and a plurality of cam means adapted for effecting a sequential displacement of said magazines relative to the said setting slides in a consecutive denominational order manner, a plurality of electromagnets adapted to be energized selectively in combinations according to coded electrical impulse circuits transmitted thereto, a decoding slide associated with each of said magnets and adapted of displacement thereby, and wherein said decoding slides determine the displacement selectively of a setting slide corresponding in digit value to a coded impulse received by said magnets, and electromagnetic means energized upon a displacement of any of said decoding slides and adapted to effect operation of the selective setting slide and set a corresponding digit value stop pawl of any displaced magazine to active position relative to the related order actuators.

12. The invention according to claim 11 and wherein the means for effecting sequential operations of the magazines includes a cylindrical member having a series of openings therein arranged in helical order and each having one edge adapted to effect displacement of a related magazine and one edge adapted to effect a restoral of said related magazine, indexing means operable by the said electromagnetic means for the setting slides and adapted to effect an operation of said cylinder following an operation of the setting slides, and wherein said operation of said cylinder will act to return a set magazine free of the setting slides while positioning another of said magazines in active relation with said slides.

13. In a computer or the like having registering/printing devices including a plurality of denominational order actuator members adapted for effecting digit value operations thereof, the combination therewith of coded read-in translator devices adapted for controlling digit value operations of said actuators in accordance with coded amounts received in the translator devices and comprising a plurality of electromagnets operable in selective combinations in accordance with said coded read-in amounts, a plurality of digit value stop pawls associated with each of said actuator members, a slidable magazine for each denominational order of said stop pawls and within which said pawls are pivotally mounted, a plurality of setting slides each in common with a corresponding digit value stop pawl of each denominational order and being positioned normally ineffective thereof, a plurality of decoding slides each adapted for displacement by a related one of said magnets, and wherein each of said slides is provided with a plurality of stop surfaces adapted for preventing substantial displacement of the related setting slides and a plurality of stop surfaces uniformly recessed and adapted for permitting a given displacement of said slides, and wherein said surfaces are arranged thereon for determining operation of a selective of said setting slides according to the displacement of combinations of said decoding slides by the related electromagnets as energized by the coded impulse received thereby, control means adapted for sequentially displacing and restoring denominational orders of said magazines relative to the said setting slides, indexing means including an electromagnet for effecting operations of said control means, circuit control means for said magnet operable in an operation of any of said decoding slides in response to each denominational order of the coded amounts received into the said translator device, and wherein an operation of the said electromagnet effects operation of any selected setting slide to set thereby a corresponding digit value stop pawl of the corresponding denominational order displaced magazine.

14. The invention according to claim 13 having cyclic operating devices for the computer including a clutch and control means therefor; means operable in a final operation of the indexing means for effecting an operation of said control means to release the said clutch and thereby cause operation of the cyclic devices for displacing the actuators, and wherein said operation of the actuators will be limited by the displaced stop pawls of the related denominational orders for effecting a registration and printing of amounts as in accordance with a selective setting of said pawls.

15. The invention according to claim 14 and including a restoring frame related to all the said stop pawls and a means operable by the cyclic devices during said operation thereof to effect an operation of said frame and thereby simultaneously restore all the set stop pawls out of engagement with the actuators.

16. The invention according to claim 15 including a shaft mounted within the magazine and upon which said stop pawls are pivotally mounted, guide slots in said magazine for maintaining the stop pawls in spaced relationship, a spring member for each of said pawls, said springs being mounted upon said shaft and adapted to maintain the pawls in frictional engagement with said guide slots for holding said pawls in their set and in their unset positions, and wherein said springs are each formed as a conical helix having a terminal turn of lesser diameter than the said shaft and an opposite terminal turn of greater diameter than said shaft.

17. A code read-in translator adapted for indicating digit values corresponding to coded amounts received therein and comprising in combination a plurality of electromagnets energized in selective coded combinations representative of digit values, decoding slides operable selectively upon energizing of a related of said magnets, and wherein each of said slides includes combinations of recessed surfaces and combinations of surfaces uniformly forward thereof, a plurality of permutation slides cooperable with said surfaces for movement selectively in accordance with a displacement of selective combinations of the said decoding slides, digit value indicating members normally out of cooperation with a related of said permutation slides, operating means for bringing said indicating members and said permutation slides into cooperative relation, control means for said operating means operable in an operation of any of said decoding slides, and means in common with all the said permutation slides and operable with said operating means for effecting operation of any selective of said permutation slides and effect thereby a setting of a corresponding of said value indicating members to value indicating position.

18. In a code translator the combination having read-in means for receiving amounts in sequential denominational order including a plurality of electromagnets adapted for receiving selectively electrical impulses in combinations representing coded amounts, decoding slides adapted for movement by a related of said magnets and upon a linear edge of each of which is formed a plurality of uniformly forward control surfaces and a plurality of spaced notches of uniform depth, a plurality of permutation slides adapted for uniform displacement selectively as determined in accordance with the displacement of selective combinations of said decoding slides, digit value indicating members in a plurality of denominational orders, a slideable magazine for each denominational order and within which said magazines the related orders of said value indicating members are mounted, operating devices adapted for displacing and thereafter restoring each of said magazines in sequential denominational order manner whereby consecutive denominational orders of said value indicating members are brought into cooperation for independent operations by a selected of said permutation slides relative to each denominational order, and wherein the said operating devices following each said displacement of a magazine effects an operation of the selected permutation slides for setting consecutive denominational orders of said value indicating means to their value indicating position.

19. In a computer or the like having value representing means and related denominational order actuator means therefor; the combination therewith of coded read-in translator devices including a plurality of decoding plates, magnetic means for displacing selective combinations of said plates in accordance with coded read-in impulse signals, a plurality of settable members related to each of said actuators and being settable selectively for controlling a given extent of movement thereof, independent support means for each order of said plurality of settable members, a plurality of value setting slides each adapted for adjusting any of the settable members of corresponding value and being operable selectively under control of the said decoding plates, control devices adapted for effecting a reciprocatory movement to successive ones of said support means whereby successive denominational orders of said settable members are moved sequentially into and out of cooperative relation with the said setting slides, an electromagnet operable under control of any of said decoding plates active in response to an input signal, and a universal means operable by said electromagnet for effecting an operation of any selected one of said setting slides.

20. In a computer or the like having value indicating means and actuator means therefor; the combination therewith of coded read-in translator devices including a plurality of decoding plates, magnetic means for displacing selective combinations of said plates in accordance with a read-in impulse signal, a plurality of digit value stops for controlling a differential extent of movement of the related order of said actuators, an independent shiftable support magazine for each denominational order of said stops, a plurality of control slides operable selectively in accordance with said decoding plates for setting a digit value stop in any denominational order, magnetic means operable upon a displacement of any of the decoding plates to effect a displacement of one of said shiftable support magazines and thereby bring the stop members thereon into active position for setting by the said control slides, and means operable by the last said magnetic means for restoring said support magazine to inactive position and to concurrently therewith effect a displacement of another of said magazines to active position and a universal means operable during operation of the last said magnetic means for effecting an operation of a selected one of said setting slides as determined by the said decoding plates.

References Cited in the file of this patent
UNITED STATES PATENTS

| | | |
|---|---|---|
| 1,291,859 | Hanson | Jan. 21, 1919 |
| 2,084,445 | Kottmann | June 22, 1937 |
| 2,185,260 | Lasker | Jan. 2, 1940 |
| 2,675,176 | Perrin | Apr. 13, 1954 |
| 2,772,048 | Collison et al. | Nov. 27, 1956 |